Patented Feb. 19, 1924.

1,484,004

UNITED STATES PATENT OFFICE.

ERNST BERL, OF DARMSTADT, GERMANY.

PROCESS FOR THE PRODUCTION OF PRODUCTS CONTAINING CELLULOSE AND ALKYLCELLULOSE.

No Drawing. Application filed October 6, 1922. Serial No. 592,841.

*To all whom it may concern:*

Be it known that I, ERNST BERL, a citizen of Czechoslovakia, residing at Darmstadt, Germany, have invented certain new and useful Improvements in a Process for the Production of Products Containing Cellulose and Alkylcellulose, for which I filed an application for patent in Germany, Sept. 23, 1921, and of which the following is a specification.

Products, such as threads or films from cellulose precipitated secondarily for instance by denitration of nitrocellulose, saponification of acetylcellulose or separation from ammoniacal solution of copper oxyde or from xanthogenate-solutions, show the inconvenience of a more or less great sensibility against water. The resistance to tearing in these products is considerably less if they are at the moist state than if they are at the dry state, the hygroscopicity being considerably increased at the same time. Products which are made from alkylcelluloses as methyl-, ethyl-, benzyl- cellulose and their homologues possess the inconvenience of bad colourability with aqueous solutions of colouring-matter.

It has been found that products with prominent qualities, which do not possess the above mentioned inconveniences, are obtained if they are composed of mixtures of cellulose precipitated secondarily and of alkylcellulose. One method consists for instance in adding, at the production of artificial silk from nitro-cellulose alkylcellulose to the colloidal solution of the nitro-cellulose for instance a colloidal solution in alcohol, ether or acetone or glacial acetic acid, the alkylcellulose being preferably in the form of a colloidal solution with dissolvants which are mixable with the dissolvants of the nitro-cellulose. The products obtained from this mixture and freed by de-nitration in the well known manner of the nitric acid contained in the same, the said products consisting of threads, films or, the like, possess in comparison with the cellulose set free in the manner hitherto used, a considerably increased resistance to water and in comparison with the products which consist of pure alkylcellulose, a much greater colourability. The physical properties of the products are also favorably influenced by the process. Amongst other advantages with regard to ductility and to the specific weight are obtained, it being possible to make the latter almost like that of natural silk.

*Examples.*

1. A quantity of ethylcellulose dissolved in alcohol, which is equal to 25–75% of the weight of the dry nitro-cellulose is added to a colloidal solution of nitro-cellulose in ether-alcohol. After homogenous mixing and filtration the collodial solution is spun to artificial silk threads after the dry or moist spinning process. The threads produced are freed of the nitrogen contained in them with the aid of sulphydrate solutions.

2. A colloidal solution of acetyl-cellulose in acetone is added to a colloidal solution of benzylcellulose in acetone and mixed homogenously. The viscous mass produced is treated in the well known manner to produce films. The films treated with an aqueous or weakly alcoholic alkali-solution in order to saponify the cellulose acetate, consist of a mixture of alkylcellulose and more or less completely saponified acetyl-cellulose.

I claim:

1. Process for the production of products containing cellulose and alkylcellulose consisting in transforming into a colloidal solution cellulose esters and alkylcellulose with the aid of dissolvants, and in treating the products produced from the mixture with substances for the conversion of the cellulose esters into cellulose.

2. Process for the production of products containing cellulose and alkylcellulose consisting in transforming cellulose esters and alkylcellulose with the aid of dissolvants into colloidal solutions in such a manner that one of these two bodies is transformed into a colloidal solution with the aid of dissolvants, the other body being added, whereupon the products from the mixture are treated with substances for the conversion of the cellulose esters into cellulose.

3. Process for the production of products containing cellulose and alkylcellulose consisting in mixing together colloidal solutions containing cellulose esters and colloidal solutions containing alkyl-cellulose, and in treating the products from the mixture with substances for the conversion of the cellulose esters into cellulose.

4. Process for the production of products containing cellulose and alkylcellulose consisting in transforming into a colloidal solution nitro cellulose and alkylcellulose with the aid of dissolvants and in treating the products from the mixture with substances for the conversion of the cellulose esters into cellulose.

5. Process for the production of products containing cellulose and alkylcellulose consisting in transforming into a colloidal solution nitro cellulose and alkylcellulose with the aid of dissolvants, in spinning the mixture to artificial silk threads, and in denitrating the latter.

In testimony whereof I have affixed my signature in presence of two witnesses.

PROF. DR. ERNST BERL.

Witnesses:
T. H. ANDERSON,
BASIL E. SAVARD.